(12) United States Patent
Kawash et al.

(10) Patent No.: US 10,134,267 B2
(45) Date of Patent: Nov. 20, 2018

(54) SYSTEM AND METHOD FOR TRACKING A PASSIVE WAND AND ACTUATING AN EFFECT BASED ON A DETECTED WAND PATH

(71) Applicant: Universal City Studios LLC, Orlando, FL (US)

(72) Inventors: Sameer Kawash, Orlando, FL (US); Justin Michael Schwartz, Orlando, FL (US); Steven C. Blum, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 17 days.

(21) Appl. No.: 14/184,591

(22) Filed: Feb. 19, 2014

(65) Prior Publication Data
US 2014/0240102 A1 Aug. 28, 2014

Related U.S. Application Data

(60) Provisional application No. 61/768,200, filed on Feb. 22, 2013.

(51) Int. Cl.
*G08C 17/02* (2006.01)
*G06F 3/03* (2006.01)
(Continued)

(52) U.S. Cl.
CPC ............. *G08C 17/02* (2013.01); *A63G 31/00* (2013.01); *A63H 30/04* (2013.01); *A63J 21/00* (2013.01);
(Continued)

(58) Field of Classification Search
CPC ...... G06F 3/017; G06F 3/0306; G06F 3/0304; G08C 17/02; A63H 30/04; A63J 21/00; A63G 31/00
See application file for complete search history.

(56) References Cited

U.S. PATENT DOCUMENTS 4,254,433 A 3/1981 Dewar, Jr. et al.
4,662,756 A 5/1987 Duran, Jr.
(Continued)

FOREIGN PATENT DOCUMENTS

JP 2007052817 3/2007
JP 2008049117 3/2008
(Continued)

OTHER PUBLICATIONS

Microsoft Research "Behind the eyes of Xbox One Kinect" Published Oct. 2, 2013, www.youtube.com/watch?v=JaOIUa57BWs.*
(Continued)

*Primary Examiner* — Ali Neyzari
(74) *Attorney, Agent, or Firm* — Fletcher Yoder P.C.

(57) ABSTRACT

A system in accordance with present embodiments includes a source of electromagnetic radiation that operates to emit electromagnetic radiation into an active playing area. The system also includes a sensing device that operates to receive the electromagnetic radiation after being reflected from a retro-reflective material of an article positioned in the active playing area and operable to generate data based on receiving reflected electromagnetic radiation from a series of article positions. Further, the system includes a controller that operates to process the data generated by the sensing device to determine whether the series of article positions correlate to a stored gesture and output a control signal to actuate an effect when the series of article positions correlate to the stored gesture.

19 Claims, 5 Drawing Sheets

(51) Int. Cl.
  *G06F 3/01* (2006.01)
  *A63H 30/04* (2006.01)
  *A63J 21/00* (2006.01)
  *A63G 31/00* (2006.01)

(52) U.S. Cl.
  CPC ............ *G06F 3/017* (2013.01); *G06F 3/0304* (2013.01); *G06F 3/0308* (2013.01)

(56) References Cited

U.S. PATENT DOCUMENTS

| | | | |
|---|---|---|---|
| 5,682,331 | A | 10/1997 | Berlin |
| 6,031,519 | A * | 2/2000 | O'Brien ............... G03H 1/0005 |
| | | | 345/156 |
| 6,176,837 | B1 | 1/2001 | Foxlin |
| 6,474,159 | B1 | 11/2002 | Foxlin et al. |
| 6,665,079 | B1 | 12/2003 | Tocci et al. |
| 6,665,985 | B1 | 12/2003 | Hennes |
| 6,761,637 | B2 | 7/2004 | Weston et al. |
| 6,784,826 | B2 | 8/2004 | Kane et al. |
| 6,796,908 | B2 * | 9/2004 | Weston ................... A63G 7/00 |
| | | | 434/55 |
| 6,831,603 | B2 | 12/2004 | Menache |
| 6,967,566 | B2 | 11/2005 | Weston et al. |
| 7,089,148 | B1 | 8/2006 | Bachmann et al. |
| 7,184,022 | B2 | 2/2007 | Xie et al. |
| 7,257,237 | B1 | 8/2007 | Luck et al. |
| 7,307,617 | B2 | 12/2007 | Wilson et al. |
| 7,356,172 | B2 | 4/2008 | Fan et al. |
| 7,395,181 | B2 | 7/2008 | Foxlin |
| 7,445,550 | B2 | 11/2008 | Barney et al. |
| 7,500,917 | B2 | 3/2009 | Barney et al. |
| 7,502,126 | B2 | 3/2009 | Ong |
| 7,505,033 | B2 | 3/2009 | Guo et al. |
| 7,519,537 | B2 | 4/2009 | Rosenberg |
| 7,618,323 | B2 | 11/2009 | Rothschild et al. |
| 7,623,115 | B2 | 11/2009 | Marks |
| 7,704,135 | B2 | 4/2010 | Harrison, Jr. |
| 7,755,608 | B2 | 7/2010 | Chang et al. |
| 7,775,439 | B2 | 8/2010 | Kimber et al. |
| 7,834,846 | B1 | 11/2010 | Bell |
| 7,850,527 | B2 | 12/2010 | Barney et al. |
| 7,854,655 | B2 | 12/2010 | Mao et al. |
| 7,863,551 | B2 | 1/2011 | Bang et al. |
| 7,874,918 | B2 | 1/2011 | Osnato et al. |
| 7,896,742 | B2 | 3/2011 | Weston et al. |
| 7,905,769 | B1 | 3/2011 | Harrison, Jr. |
| 7,918,733 | B2 | 4/2011 | Zalewski et al. |
| 7,927,216 | B2 | 4/2011 | Ikeda et al. |
| 7,996,793 | B2 | 8/2011 | Latta et al. |
| 8,058,975 | B2 | 11/2011 | Barnardo et al. |
| 8,248,367 | B1 | 8/2012 | Barney et al. |
| 8,565,535 | B2 | 10/2013 | Shamaie |
| 8,698,743 | B2 * | 4/2014 | Yabe ..................... G06F 3/017 |
| | | | 345/157 |
| 8,773,512 | B1 * | 7/2014 | Rafii ..................... G06F 3/017 |
| | | | 348/47 |
| 8,784,203 | B2 | 7/2014 | Zalewski |
| 9,176,608 | B1 * | 11/2015 | Baldwin ................. G09G 5/00 |
| 9,536,163 | B2 * | 1/2017 | Veeser ................. G01B 11/002 |
| 2003/0069077 | A1 | 4/2003 | Koreienek et al. |
| 2003/0090593 | A1 * | 5/2003 | Xiong ................. H04N 5/23248 |
| | | | 348/620 |
| 2003/0106455 | A1 | 6/2003 | Weston |
| 2004/0166937 | A1 | 8/2004 | Kopera et al. |
| 2005/0143173 | A1 | 6/2005 | Barney et al. |
| 2005/0271280 | A1 * | 12/2005 | Farmer ............... G06K 9/00832 |
| | | | 382/224 |
| 2006/0030385 | A1 | 2/2006 | Barney et al. |
| 2006/0154726 | A1 | 7/2006 | Weston et al. |
| 2006/0256081 | A1 | 11/2006 | Zalewski et al. |
| 2006/0282873 | A1 | 12/2006 | Zalewski et al. |
| 2006/0287087 | A1 | 12/2006 | Zalewski et al. |
| 2007/0259594 | A1 | 11/2007 | Galbiati et al. |
| 2007/0265075 | A1 | 11/2007 | Zalewski |
| 2008/0013826 | A1 | 1/2008 | Hillis et al. |
| 2008/0014835 | A1 | 1/2008 | Weston et al. |
| 2008/0096654 | A1 | 4/2008 | Mondesir et al. |
| 2008/0244468 | A1 | 10/2008 | Nishihara et al. |
| 2009/0051653 | A1 | 2/2009 | Barney et al. |
| 2009/0115721 | A1 | 5/2009 | Aull et al. |
| 2009/0121894 | A1 | 5/2009 | Wilson et al. |
| 2009/0124165 | A1 | 5/2009 | Weston |
| 2009/0191968 | A1 | 7/2009 | Johnson et al. |
| 2009/0215534 | A1 | 8/2009 | Wilson et al. |
| 2009/0222149 | A1 | 9/2009 | Murray et al. |
| 2009/0234666 | A1 | 9/2009 | Crawford et al. |
| 2009/0296991 | A1 * | 12/2009 | Anzola ................... G06F 3/011 |
| | | | 382/107 |
| 2009/0316952 | A1 | 12/2009 | Ferren et al. |
| 2010/0040292 | A1 | 2/2010 | Clarkson |
| 2010/0050133 | A1 | 2/2010 | Nishihara et al. |
| 2010/0091112 | A1 | 4/2010 | Veeser et al. |
| 2010/0134308 | A1 | 6/2010 | Barnardo et al. |
| 2010/0292007 | A1 | 7/2010 | Tarra et al. |
| 2010/0194762 | A1 | 8/2010 | Latta et al. |
| 2010/0199228 | A1 | 8/2010 | Latta et al. |
| 2010/0199230 | A1 | 8/2010 | Latta et al. |
| 2010/0281436 | A1 | 11/2010 | Kipman et al. |
| 2010/0304868 | A1 | 12/2010 | Zalewski |
| 2010/0306712 | A1 | 12/2010 | Snook et al. |
| 2010/0306714 | A1 | 12/2010 | Latta et al. |
| 2010/0306715 | A1 | 12/2010 | Geisner et al. |
| 2010/0306716 | A1 | 12/2010 | Perez |
| 2011/0081970 | A1 | 4/2011 | Barney et al. |
| 2011/0118021 | A1 | 5/2011 | Zalewski |
| 2011/0151974 | A1 | 6/2011 | Deaguero |
| 2011/0183751 | A1 | 7/2011 | Ueshima |
| 2011/0260033 | A1 * | 10/2011 | Steffensen ........... G01C 15/002 |
| | | | 250/203.1 |
| 2012/0040755 | A1 | 2/2012 | Pryor |
| 2012/0262366 | A1 | 10/2012 | Zhu et al. |
| 2012/0278720 | A1 | 11/2012 | Yabe et al. |

FOREIGN PATENT DOCUMENTS

| | | | |
|---|---|---|---|
| WO | 2012164345 | 12/2012 | |
| WO | 2012178202 | 12/2012 | |
| WO | WO 2013081632 A1 * | 6/2013 | ............ G06F 1/1616 |

OTHER PUBLICATIONS

Ifixit "Xbox One Kinect Teardown" Published Nov. 21, 2013, www.ifixit.com/Teardown/Xbox+One+Kinect+Teardown/19725.*
3M, "Retroreflection," Personal Safety Products, 3M Occupational health and Environmental Safety Division; St. Paul, Minnesota, 2005, www.3M.com/Scotchlite.
Invitation to Pay Additional Fees and, Where Applicable, Protest Fee for International Application No. PCT/US2014/017817 dated May 28, 2014.
Ouchi et al., "Magic Wand: An Intuitive Gesture Remote Control for Home Appliances," May 2005.
SG 11201505572V Search Report and Written Opinion dated Mar. 25, 2016.
SG 11201505572V Written Opinion dated Oct. 19, 2016.
JP 2015-559022 Office Action dated Feb. 13, 2018.
CN 201480009950.9 Office Action dated Oct. 9, 2017.
RU 2015135389 Office Action dated May 17, 2018 and Search Report dated Mar. 13, 2018.
EP 14710127.3 Communication pursuant to Article 94(3) EPC dated May 14, 2018.
JP 2015-559022 Decision to Grant dated Aug. 13, 2018.

* cited by examiner

SYSTEM AND METHOD FOR TRACKING A PASSIVE WAND AND ACTUATING AN EFFECT BASED ON A DETECTED WAND PATH

This application claims the benefit of U.S. Provisional Application No. 61/768,200, filed Feb. 22, 2013 and entitled "System and Method for Tracking a Passive Wand and Actuating an Effect Based on a Detected Wand Path," which is incorporated by reference in its entirety.

FIELD OF DISCLOSURE

The present disclosure relates generally to the field of amusement parks. More specifically, embodiments of the present disclosure relate to methods and equipment utilized to entertain guests by generating effects based on detected wand movement.

BACKGROUND

Since the early twentieth century, amusement parks (or theme parks) have substantially grown in popularity. Accordingly, there has been an increased demand and an accompanying increase in competition with respect to amusement parks. It is therefore desirable to add more entertaining and larger numbers of attractions to amusement parks. The addition of large attractions, such as rides and shows, generally provides an amusement park with additional capacity to handle a larger number of guests. However, such attractions tend to draw more visitors and become hubs for guest traffic. Further, the addition of traditional rides without an added layer of intrigue may be insufficient to garner sufficient guest interest to address either guest traffic issues or provide an advantage over competitors. Accordingly, it is now recognized that systems and methods that facilitate distribution of guest traffic and/or provide increased levels of entertainment value are desirable.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a source of electromagnetic radiation configured to emit electromagnetic radiation into an active playing area. The system also includes a sensing device configured to receive the electromagnetic radiation after being reflected from a retro-reflective material of an article positioned in the active playing area and configured to generate data based on receiving reflected electromagnetic radiation from a series of article positions. Further, the system includes a controller configured to process the data generated by the sensing device to determine whether the series of article positions correlate to a stored gesture and output a control signal to actuate an effect when the series of article positions correlate to the stored gesture.

In another embodiment, a method includes emitting electromagnetic radiation into an active playing area from an emitter. The method also includes receiving the electromagnetic radiation at a sensing device after the electromagnetic radiation has been reflected from a retro-reflective material of an article positioned in the active playing area. Further, the method includes generating data with the sensing device based on receiving reflected electromagnetic radiation from a series of article positions, and processing the data generated by the sensing device with a controller to determine whether the series of article positions correlate to a stored gesture and outputting a control signal from the controller when the series of article positions correlate to the stored gesture.

In another embodiment, a system includes an electromagnetic radiation emitter and a sensing device configured to receive the electromagnetic radiation after being reflected from a retro-reflective material of an article positioned in the active playing area and configured to generate data based on receiving reflected electromagnetic radiation from a series of article positions. Further, the system includes a controller and a processing engine of the controller. Additionally, the system includes a feature extraction module of the processing engine configured to extract relevant data from the data generated by the sensing device, and a gesture recognition module of the processing engine configured to analyze the relevant data to determine whether the series of article positions correspond to a known gesture.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

It has now been recognized that it is desirable to provide small interactive attractions throughout an amusement park that economically entertain the guests while also diverting traffic from major attractions. It has also been recognized that all attractions, whether large or small, may benefit from an interactive component or layer. Accordingly, present embodiments are directed to a passive article tracking system that is capable of tracking movement of a passive article (e.g., wand) and actuating certain effects based on an identified article or wand path corresponding to a defined gesture.

The disclosed wand tracking system may be implemented as or with amusement park attractions including shows, restaurants, rides, shops, and so forth. Present embodiments enable implementation in outdoor and indoor environments, which facilitates implementation in a variety of scenarios. Further, present embodiments include economical and theme-oriented components and characteristics of operation. For example, an actuation tool in accordance with present embodiments includes a passive wand, which has no actively functioning components (e.g., no light emitting diodes, gyroscopes, or radio frequency identification transmitter). This serves to keep the operational aspects of the wand a mystery, which is in keeping with a magical theme and also makes the wand more economical. For example, the passive wand does not include electronics or require batteries, which adds intrigue with respect to its operation while, more practically, saving expenses associated with including electronic components and batteries. By employing the passive wand detection system as an attraction or along with an attraction in an amusement park, guests are incentivized to visit the amusement park and are further enabled to immerse themselves in the thematic experience provided by the amusement park.

Figure 1:
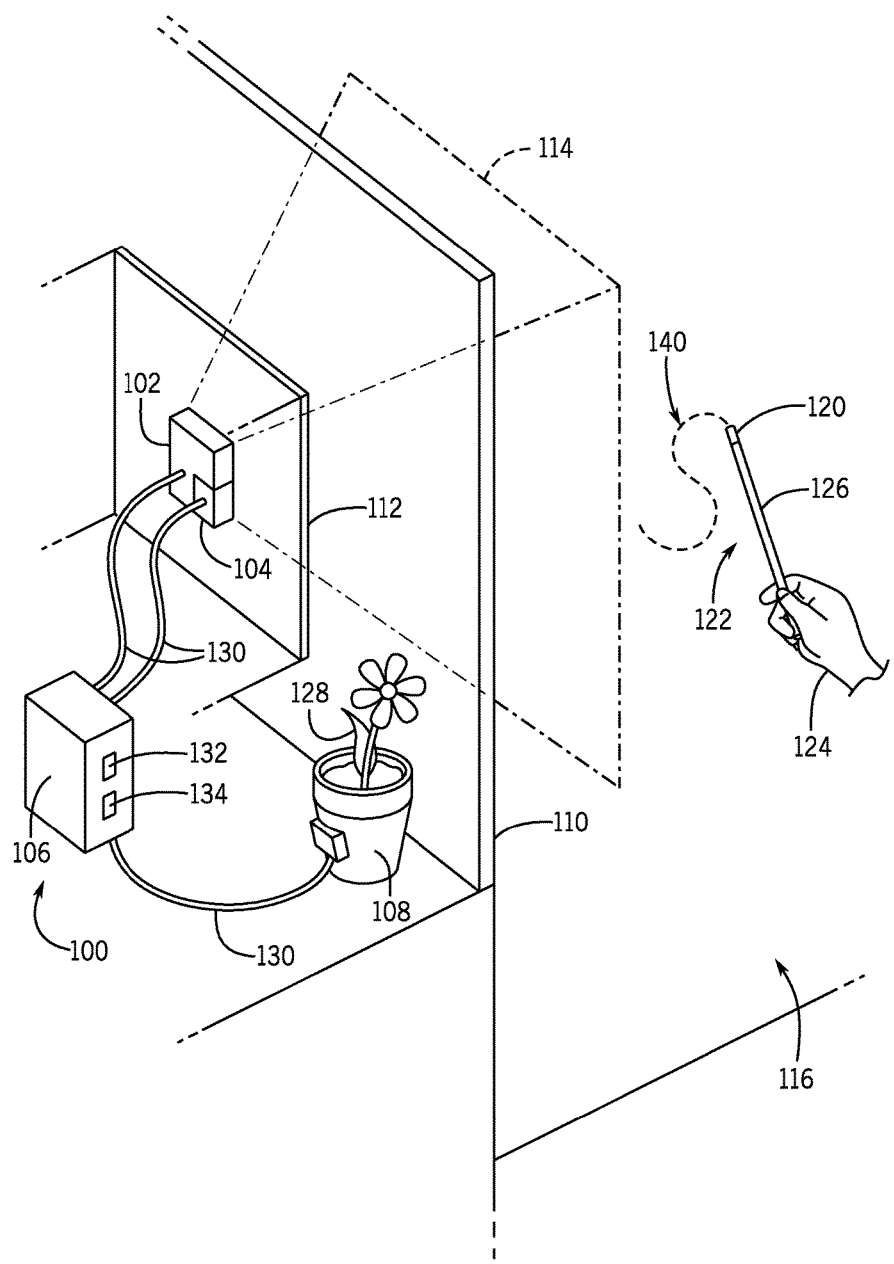
FIG. 1 is a perspective view of an amusement park attraction including a passive wand tracking system in accordance with present techniques.

FIG. 1 is a perspective view of a system 100 in accordance with present embodiments. The system 100 may incorporate material and functional features such as disclosed in U.S. Pat. No. 6,665,079, which is hereby incorporated by reference. The system 100 is designed to detect relative positioning of an illuminated component having a properly correlated retro-reflective material and to utilize the relative positioning to identify whether a correlation exists between predefined gestures and a path traced by the illuminated component. If a proper correlation is found to exist, the system is capable of actuating an effect (e.g., activate a motor, ignite a flame, or open a valve) to provide entertainment to amusement park guests. In one embodiment, if a proper correlation is found, an output may be provided to a computer, display, or monitoring device. Specifically, the system 100 includes an emitter 102, a sensing device 104, a controller 106, and an effect device 108. In the illustrated embodiment, the system 100 is completely disposed behind a window 110 and components of the system are hidden from view through the window by camouflaging material 112 (e.g., mirrored glass, netting, or textured plastic) to make the system invisible to participants. However, different arrangements of components of the system 100 and implementations in different environments are included in the present disclosure.

The emitter 102 operates to emit electromagnetic radiation, which is represented by an expanding light beam 114 for illustrative purposes, to bathe or flood an active playing area 116 in the electromagnetic radiation. The light beam 114 may be representative of multiple light beams being emitted from different sources. Further, the light beam 114 is emitted at a frequency that has a correspondence to a material defining a retro-reflective tip 120 on a wand 122 that is being wielded by a guest 124. The retro-reflective tip 120 may include a coating of retro-reflective material disposed on a body 126 of the wand 122 or a solid piece of material coupled with the body 126 of the wand 122. The retro-reflective tip 120 may coordinate with the light beam 114 to reflect electromagnetic radiation back towards the sensing device 104 to facilitate identification of a location of the retro-reflective tip 120 by the system 100. This location information (obtained based on the reflected electromagnetic radiation) may then be utilized by the controller 106 to determine whether the effect device 108 or a component of the effect device should be actuated, such as causing a fake flower 128 of the effect device 108 to move. It should be noted that, in some embodiment, the retro-reflective material may be positioned at different locations on the wand 122 other than the tip. Further, in some embodiments, the light beam 114 represents a limited number of light beams or light emissions (provided in series or simultaneously) that are used to identify the position of the wand 122, which may be facilitated by the retro-reflective tip 120. Indeed, the retro-reflective tip may operate or be designed to always or essentially always return radiation (e.g., light) to its source.

Specifically, in operation, the sensing device 104 of the system 100 may function to detect the light beam 114 bouncing off of the retro-reflective tip 120 and provide data associated with detection to the controller 104 via cables 130 for processing. It should be noted that while in the illustrated embodiment the various components of the system 100 are communicatively coupled with electric cabling 130, in other embodiments the components may communicate wirelessly. Once the controller 106 receives the data from the sensing device 104, the controller 106 may utilize a processor 132 and/or a memory 134 to determine a location of the retro-reflective tip 120. Indeed, the controller 106 may employ known visual boundaries or an established orientation of the sensing device 104 to identify a location (e.g., coordinates) corresponding to the detected retro-reflective tip 120.

Figure 2:
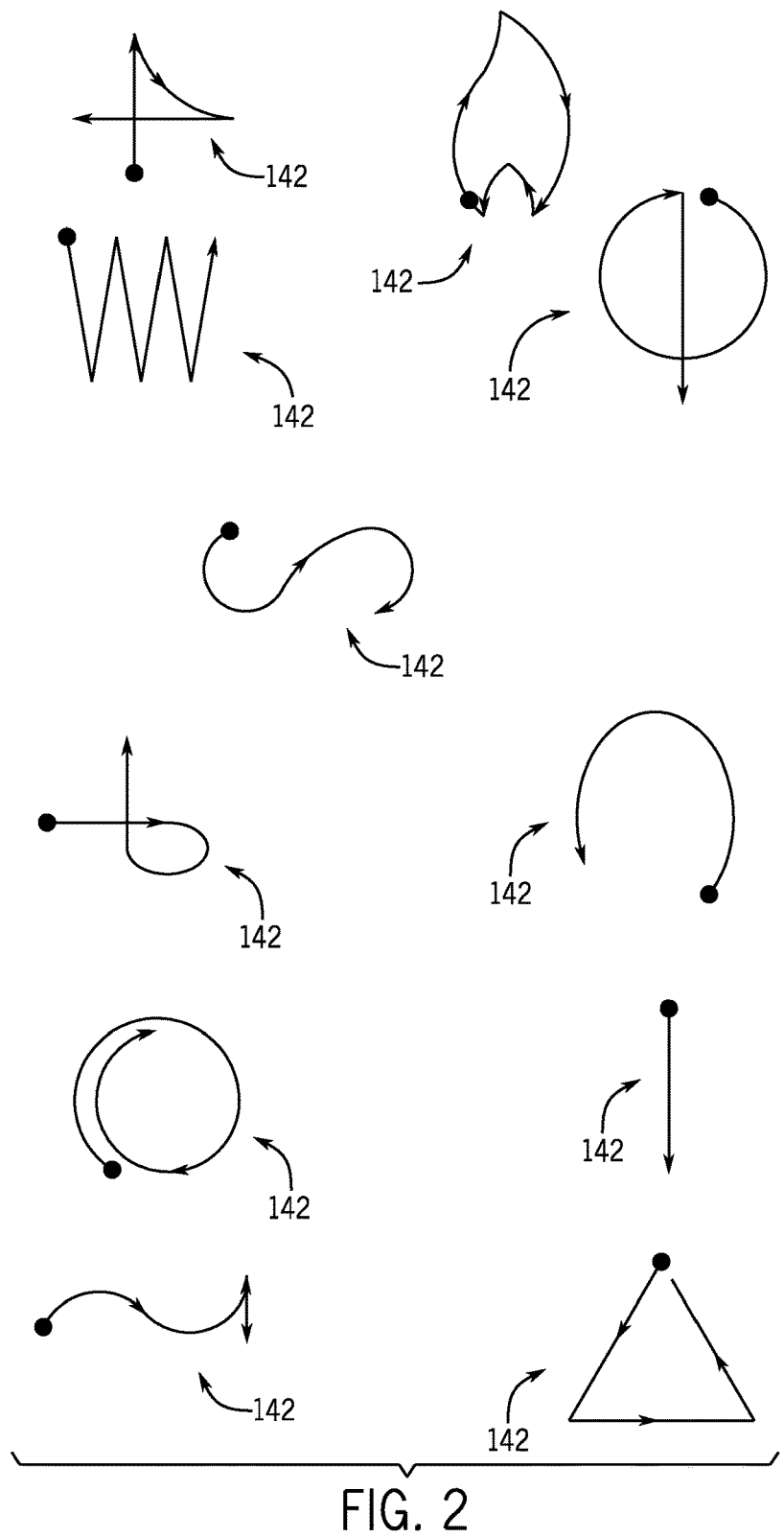
FIG. 2 is a representation of reference wand paths or gestures that may be stored in a passive wand tracking system and utilized to determine whether a particular output should be generated based on a detected wand path or gesture in accordance with present embodiments.

The process of emitting the light beam 114, sensing of the reflected light from the retro-reflective tip 120, and determining a location of the retro-reflective tip 120 may be performed by the controller 100 numerous times over a short period in order to identify a series of locations of the retro-reflective tip 120. Indeed, such procedures may essentially be performed continuously to facilitate identification of a path 140 through which the retro-reflective tip 120 has moved within the active playing area 116 during a particular timeframe or simply in continuous series. Once the path 140 has been detected, a determination is made by the controller 106 as to whether the path 140 properly correlates to a pattern or gesture identified by the system 100 as corresponding to actuation of the effect device 108. For example, the system 100 may perform a comparison of the path or identified path 140 with stored paths 142 (such as illustrated in FIG. 2) to determine whether one or more actions should be performed by the effect device 108. For example, if the identified path 140 correlates to a particular one of the stored paths 142, the controller 106 may actuate the effect device 108 such that the flower 128 is made to move. This gives the illusion that a guest properly performing a wand movement is magically causing the flower to move or grow. It should be noted that a correspondence between the identified path 140 and particular stored paths 142 may result is different types of actuation (e.g., a first wand movement may cause the flower to appear to shrink and a second wand movement may cause the flower to appear to grow). It should be noted that some embodiments may perform interpolation between identified positions as a component of identifying the path 140.

Figure 3:
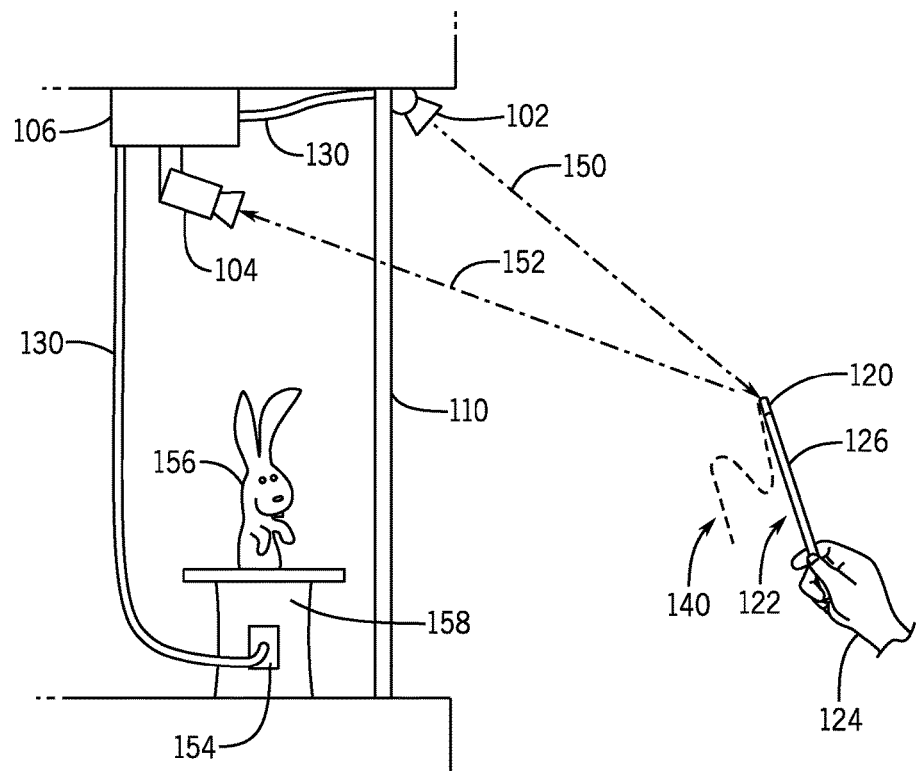
FIG. 3 is a side view of an amusement park attraction including a passive wand tracking system in accordance with present techniques.

In the embodiment illustrated by FIG. 1, the emitter 102 and the sensor or sensing device 104 are integral features such that a plane of operation associated with the sensing device 104 is essentially overlapping with a plane of operation associated with the emitter 102. However, the sensing device 104 (e.g., an infrared camera) may be positioned in a different location with respect to the emitter 102, which may include an infrared light bulb. For example, as illustrated in FIG. 3, the emitter 102 and sensing device 104 are separate and positioned in different locations. Specifically, the emitter 102 of FIG. 3 is positioned outside of the window 110 of a storefront containing other components of the system 100. The sensing device 104 of FIG. 3 is positioned away from the emitter 102 but still oriented to detect light reflected from the retro-reflective tip 120 and originating from the emitter 102. For illustrative purposes, arrows 150, 152 represent a light beam being emitted from the emitter into the active playing area 116, reflected by the retro-reflective tip 120, and detected by the sensing device 104. The light beam represented by the arrow 150 is merely one of numerous light beams that flood or otherwise selectively illuminate the active playing area from the emitter 102.

As in FIG. 2, the system of FIG. 3 utilizes a series of detected emitter light reflections (e.g., 152) from the retro-reflective tip 120 to identify and/or track wand positioning. The sensing device 104 generates data based on the reflected electromagnetic radiation (e.g., 152) and a series of detections may correspond to the detected wand path 140. The controller 106 assembles this data and determines whether certain patterns were formed by the detected path 140 traced by the retro-reflective wand tip 120 during a certain timeframe or in a continuous series despite the timeframe. If certain known or stored patterns 142 correlate (e.g., match) with the detected path 140, the controller 106 may actuate the effect 108, such as activate a motor 154 to move a fake rabbit 156 out of a hat prop 158.

Figure 4:
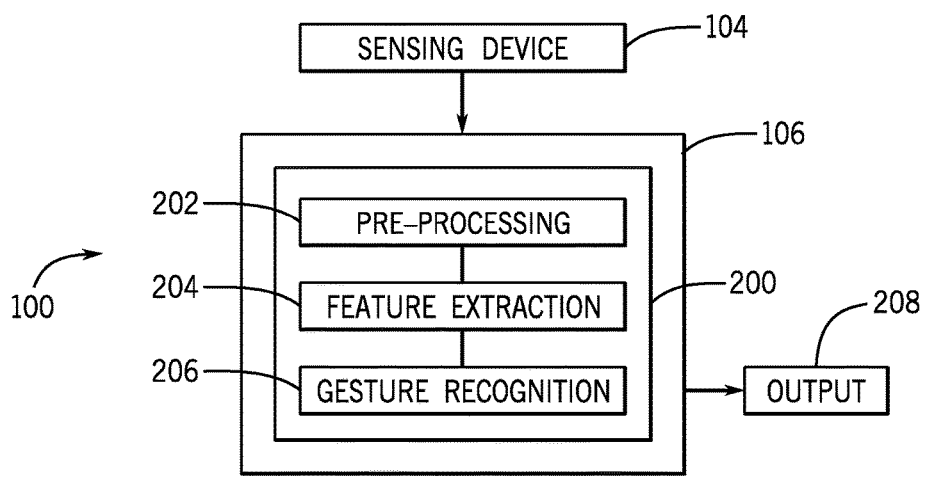
FIG. 4 is a block diagram of a passive wand tracking system in accordance with present techniques.
Figure 5:
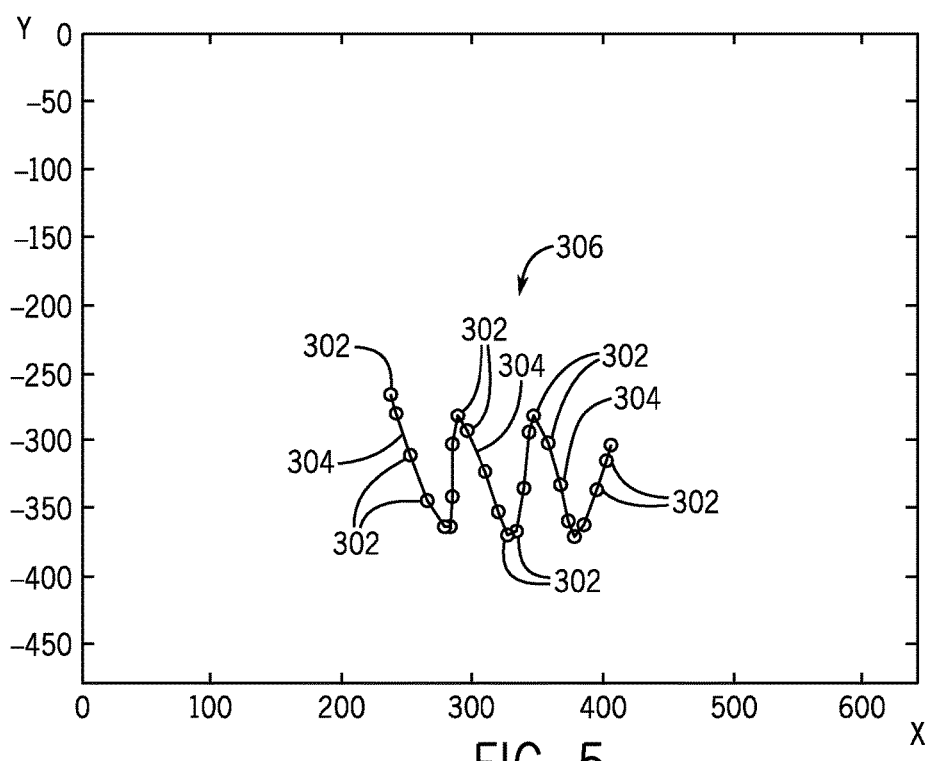
FIG. 5 is a plot of detected positions of a passive wand and an interpolated path defined by a passive wand tracking system in accordance with present embodiments.

FIG. 4 illustrates a block diagram of the system 100 and certain details of a processing engine 200 of the controller 106 in accordance with present embodiments. The system 100 performs data acquisition with the detector or sensing device 104 and then the controller 106 utilizes the data to classify gestures or movement paths of the retro-reflective wand tip 120. Specifically, the processing engine 200 may perform certain pre-processing tasks on data received from the sensing device 104 with a pre-processing module 202. This pre-processing module 202 may function to facilitate robust performance when operating in various different light conditions (e.g., the active playing area 116 is in broad daylight). Next, a feature extraction module 204 may function to extract certain features from the data acquired from the sensing device 104 and pre-processed by the pre-processing module 202. This extraction of features may include determining wand positions within a frame, tracking multiple wands (e.g., identify and track ten different wand gestures simultaneously), identifying gesture temporal segmentation with motion trajectories between static wand positions considered to be potential gestures, and trajectory interpolation. For example, FIG. 5 illustrates a plot of detected locations 302 of the retro-reflective wand tip within a frame and interpolations 304 between the detected locations 302. The detected locations 302 and interpolation 304 cooperate to form a pattern 306, which is essentially the detected wand path 140. This detected wand path 140 is then analyzed by a gesture recognition module 206 to determine whether the detected wand path 140 correlates to a stored wand path 142. If there is sufficient correspondence between the detected wand path 140 and a one of the stored wand paths 142, the processing engine 200 or controller 106 will actuate an associated output 208. This may include directly activating an effect device 108 or instructing a separate controller (e.g., a programmable logic controller) to perform the task. It should be noted that the controller 106 may include a computer or any of various different industrial automation controllers.

Figure 6:
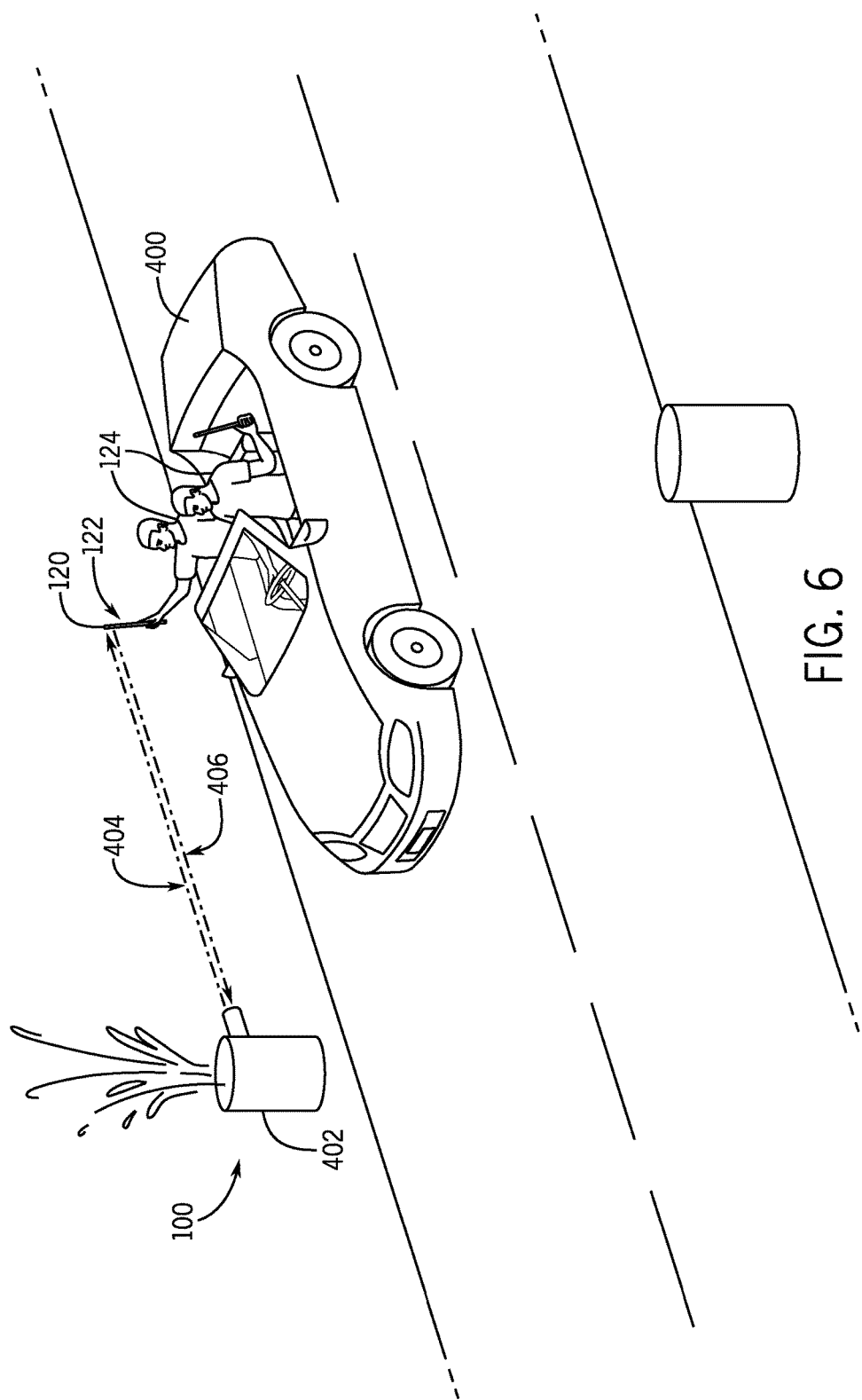
FIG. 6 is a perspective view of an amusement park attraction including a ride system in coordination with a passive wand tracking system in accordance with present embodiments.

Present embodiments include a wand-based gesture recognition system and method for use in an amusement park. In particular, the embodiments illustrated in FIGS. 1 and 2 are generally representative of implementations in a storefront environment. However, in other embodiments, the system 100 may be employed to add a layer of entertainment to other entertainment features. For example, as illustrated in FIG. 6, the system 100 may be employed in conjunction with a ride to add to guest enjoyment and immersion in the ride environment. Specifically, for example, FIG. 6 illustrates guests 124 on a ride vehicle 400 utilizing the system 100 to actuate activation of a water fountain 402 integrated in the ride environment. As described above, the system is projecting light 404 and receiving reflected light 406 to identify gestures made with the wand 122 or, more precisely, the retro-reflective wand tip 120.

Present embodiments include the system being capable of detecting a passive wand with a retro-reflective material that allows a guest to manipulate the wand to control various effects when proper gestures are made within an active playing area. The system functions without any active features on the wand. That is, the wand does not include a gyroscope, light emitter, radio frequency transmitter, or any other functional component. This not only simplifies the system for users but also provides a cost benefit. Further, present embodiments enable operation in a wide range of lighting conditions (including broad daylight), whereas traditional gesture recognition technologies do not function well in broad daylight due to interference from electromagnetic radiation from the sun. Present embodiments allow an amusement park to add small venues for guest entertainment and diversify other attractions.

Certain operational characteristics and feature capabilities may be desirable for the system and related components. For example, the emitter and detector may be configured to operate specifically within a defined range. As a specific example, the active playing area may extend approximately 5-12 feet from the emitter and/or detector. Further, the retro-reflective material utilized for the retro-reflective wand tip may require certain characteristics such that only enabled devices are recognized by the system. Further, the retro-reflective material and the system may coordinate to increase tolerance of background noise. The system may be designed to include different tolerance levels with respect to identifying correspondence between the identified path and stored paths based on different retro-reflective materials to enable different difficulties for younger guests.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system comprising:
a source of electromagnetic radiation configured to flood an active playing area with electromagnetic radiation;
an article positioned in the active playing area and comprising a retro-reflective material, wherein the retro-reflective material is a solid component of the article or the retro-reflective material is a coating on the article;
a sensing device configured to receive the electromagnetic radiation after being reflected from the retro-reflective material of the article positioned in the active playing area and configured to generate data based on receiving reflected electromagnetic radiation from a series of article positions, wherein the source of electromagnetic radiation and the sensing device are each in respective fixed positions; and a controller configured to process the data generated by the sensing device to determine whether the series of article positions correlate to a stored gesture and output a control signal to actuate an effect when the series of article positions correlate to the stored gesture, wherein the controller is configured to pre-process the data to remove interference received by the sensing device when the active playing area is in broad daylight.

2. The system of claim 1, wherein the source of electromagnetic radiation is configured to emit the electromagnetic radiation at a limited frequency having a correspondence to the retro-reflective material to increase a tolerance of the sensing device to background noise.

3. The system of claim 1, wherein the article comprises a wand.

4. The system of claim 1, wherein the controller is configured to interpolate between the series of article positions to facilitate determining whether the series of article positions correlate to the stored gesture.

5. The system of claim 1, wherein the source of electromagnetic radiation and the sensing device are located apart from one another.

6. The system of claim 1, wherein the active playing area includes a portion of a path for a ride vehicle, the source of electromagnetic radiation and the sensing device are at respective fixed positions located outside of the path, and the sensing device is configured to detect activity occurring in a passenger compartment of the ride vehicle when positioned on the portion of the path.

7. The system of claim 1, wherein the sensing device is within a ride vehicle.

8. The system of claim 1, comprising an effect device configured to perform the effect.

9. The system of claim 1, comprising an effect device configured to perform the effect and positioned outside of the active playing area.

10. The system of claim 1, wherein the sensing device and the controller are configured to communicate via one or more cables.

11. The system of claim 1, wherein the controller comprises a gesture recognition module including a plurality of pre-programmed gesture characteristics.

12. A method comprising:
emitting electromagnetic radiation into an active playing area such that the active playing area is flooded with the electromagnetic radiation;
receiving the electromagnetic radiation at a sensing device after the electromagnetic radiation has been retro-reflected from a retro-reflective material of an article positioned in the active playing area, wherein a source of the electromagnetic radiation and the sensing device are each in respective fixed positions;
generating data with the sensing device based on receiving reflected electromagnetic radiation from a series of article positions;
pre-processing the data generated by the sensing device with a controller to remove interference received by the sensing device when the active playing area is in broad daylight; and
processing the data generated by the sensing device with the controller to determine whether the series of article positions correlate to a stored gesture and outputting a control signal from the controller when the series of article positions correlate to the stored gesture.

13. The method of claim 12, comprising actuating an effect based on the control signal.

14. The method of claim 13, comprising receiving an actuation signal from the controller at an effect device and then actuating the effect.

15. The method of claim 12, comprising generating the series of article positions with a wand comprising the article with the retro-reflective material.

16. A system, comprising:
an electromagnetic radiation emitter configured to flood an active playing area with electromagnetic radiation from a fixed position;
a plurality of articles positioned in the active playing area, wherein each article of the plurality of articles comprises a retro-reflective material, and wherein the retro-reflective material is a solid component of each article of the plurality of articles, or the retro-reflective material is a coating on each article of the plurality of articles;
a sensing device configured to receive the electromagnetic radiation after being reflected from the retro-reflective material of an article of the plurality of articles positioned in the active playing area and configured to generate data based on receiving reflected electromagnetic radiation from a series of positions of the plurality of articles;
a controller communicatively coupled to the sensing device;
a processing engine of the controller configured to pre-process the data generated by the sensing device to remove interference received by the sensing device when the active playing area is in broad daylight;
a feature extraction module of the processing engine configured to extract relevant data from the data generated by the sensing device such that the controller is configured to simultaneously identify and track a respective series of positions of each article of the plurality of articles and to treat each respective series of positions as a potential gesture performed using a respective article of the plurality of articles; and
a gesture recognition module of the processing engine configured to analyze the relevant data to determine whether any of the respective series of positions result in a respective gesture that adequately matches a stored gesture associated with an actuatable amusement park effect.

17. The system of claim 3, wherein the wand does not include active features.

18. The system of claim 1, wherein the controller is configured to identify correspondence between the series of article positions and the stored gesture using different tolerance levels, the different tolerance levels being associated with different retro-reflective materials.

19. The system of claim 1, wherein the controller is configured to process the data generated by the sensing device to determine whether the series of article positions correlate to the stored gesture, the stored gesture being one of a plurality of stored gestures associated with different actuated effects, and wherein the effect is associated with the stored gesture.

* * * * *